May 28, 1974     L. C. VARNER, JR     3,813,279
ELASTIC FOAM CARPET UNDERLAY
Filed April 27, 1972     2 Sheets-Sheet 1
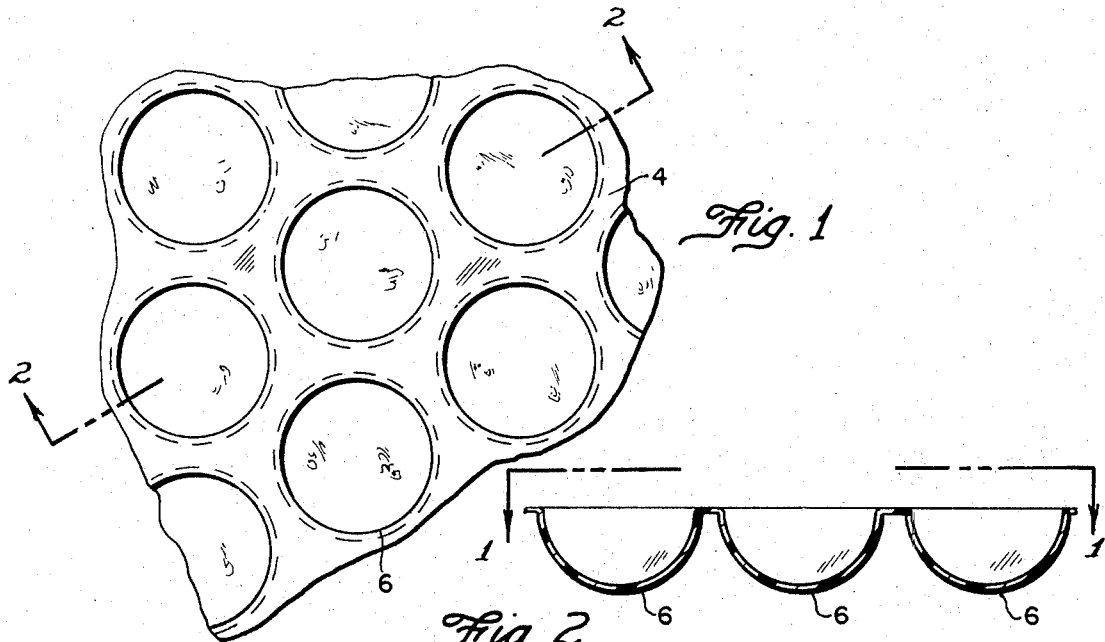
Fig. 1
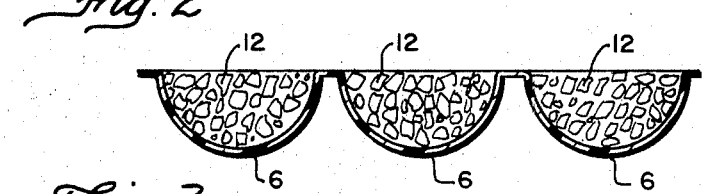
Fig. 2
Fig. 3
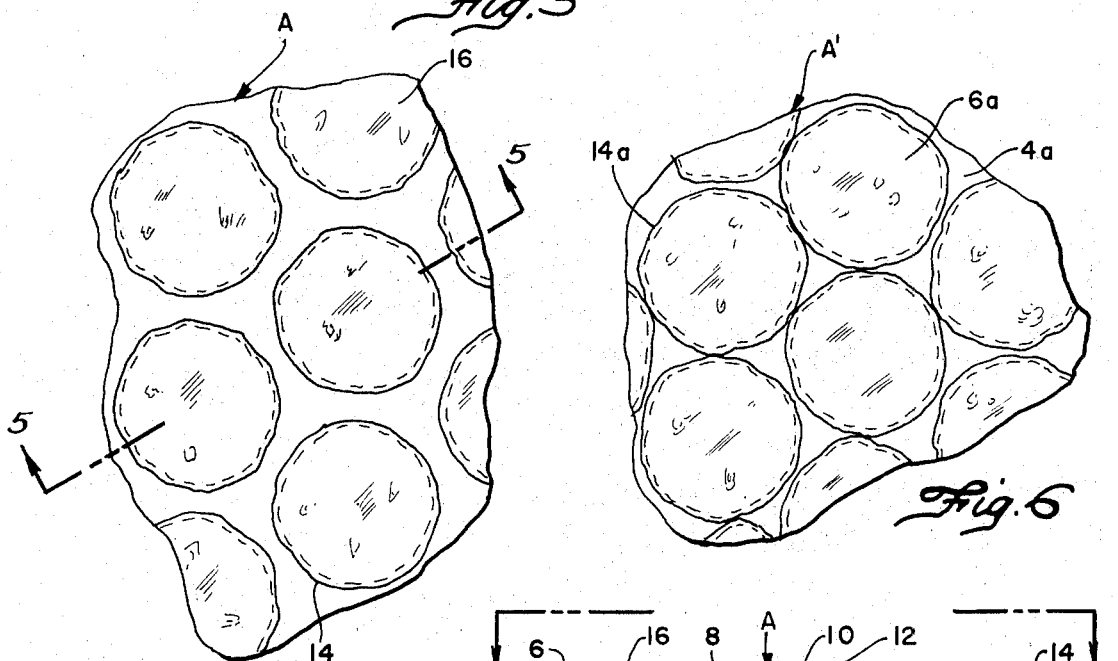
Fig. 4
Fig. 6
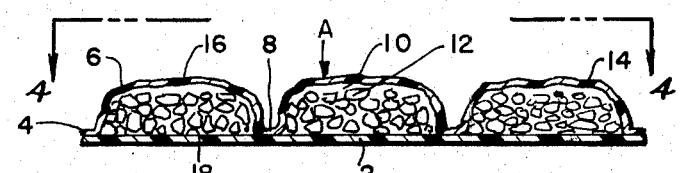
Fig. 5

May 28, 1974 — L. C. VARNER, JR — 3,813,279

ELASTIC FOAM CARPET UNDERLAY

Filed April 27, 1972 — 2 Sheets-Sheet 2

INVENTOR.
LAWRENCE C. VARNER, JR.
BY
ATTORNEY

United States Patent Office 3,813,279
Patented May 28, 1974

3,813,279
ELASTIC FOAM CARPET UNDERLAY
Lawrence C. Varner, Jr., % The General Tire & Rubber Co., P.O. Box 951, Akron, Ohio 44309
Continuation-in-part of abandoned application Ser. No. 98,506, Dec. 16, 1970. This application Apr. 27, 1972, Ser. No. 248,172
Int. Cl. B32b 3/28
U.S. Cl. 161—127                28 Claims

ABSTRACT OF THE DISCLOSURE

A fireproof carpet underlay is provided which has improved load-deflection characteristics and yet can be made at a fraction of the cost of conventional carpet underlay. The underlay is made from polyurethane foam scrap of low density (i.e., 1 to 3 pounds per cubic foot) and two thin sheets of inexpensive plastic material, such as polyethylene or polyvinyl chloride coated with a vinylidene chloride polymer. The underlay has a multiplicity of regularly spaced circular or polygonal pockets sandwiched between the two plastic sheets and containing a substantial amount of air and a fire-retardant liquid, such as water, in a major amount by weight sufficient for fireproofing. Each pocket functions as an air cushion and takes up a substantial proportion of the load (i.e., 20 to 50 percent) by compression of air, the balance being taken by compression of the foam.

This application is a continuation-in-part of my copending application Ser. No. 98,506, filed Dec. 16, 1970, now abandoned.

The present invention relates to a revolutionary type of low cost carpet underlay and more particularly to a carpet underlay formed of thin plastic sheets sandwiched together to provide a multiplicity of hermetically sealed air pockets containing pieces of scrap foam rubber and substantial amounts of water or other fire-retardant liquid.

Some sort of cushioning material or carpet underlay is required for most carpeting. It prolongs carpet life, subdues sound and enhances walking comfort. Conventional carpet underlay is in the form of one or more layers of elastic foam in a flat or gridded pattern, usually having a fabric backing. The foam usually has a density of around 6 pounds per cubic foot to provide adequate support without an excessive thickness. A waffle pattern or the like may be employed to save material. A layer of burlap or a scrim layer of polyethylene or other plastic or rubber is commonly provided on the side of the underlay engaging the carpet.

In some cases carpet underlay is made from rebonded scrap foam to reduce the cost but this is not used extensively. The density of such foam is 4 to 6 pounds per cubic foot or higher and is greater than the density of the original scrap foam.

In order for a foam rubber material to function satisfactorily as a carpet underlay, it must have adequate strength and density to support a normal load and also satisfactory load-deflection characteristics. It should not deflect too rapidly under low loads or be too hard or stiff. The suitable characteristics can be obtained by providing a predetermined balance between the closed-cell foams and the open-cell foams. For example, the foam rubber compositions can be compounded with various pneumatogens that produce the desired cell structures or can otherwise be formed to provide a predominantly open-cell or closed-cell structure with acceptable load-deflection characteristics.

Prior to the present invention, the cost of carpet underlay was substantial because of the need for elastic foam having a density, such as 5 or 6 pounds per cubic foot, high enough to provide adequate load support in the preferred thickness range of ¼ to ½ inch. This was further increased because of the requirement that the underlay pass certain flammability tests. A foam rubber carpet underlay should contain a flame-retardant material or have flame-resistant characteristics such that it can pass tests such as ASTM-D 1692, ASTM-D 626, the "pill test" involved in the Hill-Burton Act or the E-84 Tunnel Test.

At the time the present invention was made, the most popular carpet underlays were made of foam rubber and were relatively expensive. The cost of manufacture of such common foam rubber underlays is several times that of the underlay of this invention. The present invention is revolutionary in that it reduces the cost of manufacture to a minimum (i.e., 20 to 30 cents per square yard) while at the same time providing a high-quality long-lasting product with load-deflection characteristics superior to those of the conventional foam rubber underlays. The underlay has further advantages in that it can be fireproofed at minimum cost using an inexpensive non-flammable liquid, such as water, and in that it can be mass produced by an economical continuous process using automatic machines. It can also be produced in a relatively light weight to facilitate handling and installation of wide rolls of large area, such as those with an area in excess of 100 square yards.

The carpet underlay of the present invention comprises a laminate formed by a pair of thin flexible impervious sheets of polyethylene or other plastic, preferably having a thin layer of saran, one of the sheets having a multiplicity of closely spaced embossments forming hermetically sealed pockets between the sheets. The pockets contain entrapped air and pieces of scrap polyurethane foam or the like with a density preferably from about 1 to about 3 pounds per cubic foot which provide the underlay with the desired load-supporting characteristics and the desired thickness, preferably from about ¼ to about ½ inch. The pockets preferably contain an amount of water with a weight at least several times that of the foam to render the underlay sufficiently flame resistant.

The amount of air in the foam is such that a major portion of the load is taken by compression of the elastic foam under light loads and low deflections and is preferably such that a substantial portion of the load (i.e., 25 to 50 percent or more) is taken by compression of the air under heavy loads and high deflections. The volume of air in the underlay and the type of foam may be selected to provide load-deflection characteristics particularly well suited for carpet underlay and superior to those of the most popular carpet underlays known prior to this invention.

An object of the present invention is to provide a carpet underlay with improved load-deflection characteristics.

A further object of the invention is to minimize the cost of manufacture of high-quality foam rubber carpet underlay.

A still further object of the invention is to minimize the cost of fireproof carpet underlay.

Another object of the invention is to provide a carpet underlay of high quality which employs scrap pieces of polyurethane of relatively low density.

Another object of the invention is to provide a high-quality cushioning laminate of extremely light weight.

These and other objects, uses and advantages of the invention will become apparent to those skilled in the art from the following drawings, descriptions and claims.

In the drawings:

FIG. 1 is a fragmentary top plan view looking in the direction of the arrows 1—1 of FIG. 2 and show an embossed plastic sheet used in the underlay of the present invention;

FIG. 2 is a fragmentary vertical sectional view taken substantially on the line 2—2 of FIG. 1;

FIG. 3 is a fragmentary vertical sectional view similar to FIG. 2 showing the embossed sheet after the pockets thereof have been substantially filled with pieces of scrap foam rubber;

FIG. 4 is a top plan view looking in the direction of the arrows 4—4 of FIG. 5 showing the carpet underlay of the present invention;

FIG. 5 is a fragmentary vertical sectional view taken on the line 5—5 of FIG. 4 and on the same scale;

FIG. 6 is a fragmentary top plan view similar to FIG. 4 but showing a somewhat modified form of carpet underlay wherein the pockets are of larger diameter and closer together.

Figure 7:
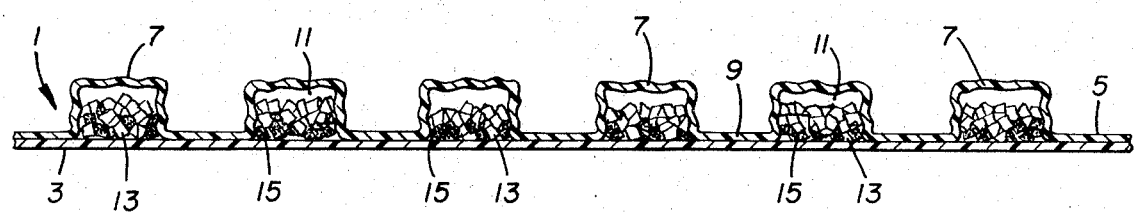
FIG. 7 is a fragmentary vertical sectional view of another form of carpet underlay.

Referring more particularly to the drawings, in which like parts are identified by the same numerals throughout the several views, FIGS. 4 and 5 show a carpet underlay or cushioning laminate A comprising a first generally flat flexible impervious plastic sheet 2, a second flexible impervious plastic sheet 4 containing a multiplicity of closely spaced embossments 6 extending away from the sheet 2 to provide a large number of hermetically sealed pockets 10, and a relatively thick foam layer in each pocket formed by a large number of pieces of scrap foam rubber 12.

The carpet underlay A can be used in the position shown in FIG. 5 (or FIG. 7) but it is usually used in the inverted position with the sheet 4 engaging the floor and the sheet 2 engaging the underside of the carpet.

The embossed sheet 4 may be originally molded or formed as indicated in FIGS. 1 and 2. The sheet consists of a large number of embossments 6 arranged in regular closely spaced relationship in parallel rows preferably so that the center of one embossment is spaced equal distances from the six surrounding embossments 6. A portion only is shown in FIG. 1, it being understood that the sheet 4 and the underlay A will preferably be formed as a continuous sheet or underlay of a substantial width such as 6 to 15 feet and a length usually in excess of 10 feet so that the area of one piece may be, for example, 10 to 100 square yards. The entire sheet would, of course, employ the same pattern which could be that shown in FIG. 4 or FIG. 6, for example.

Each sheet consists of the embossments 6 and the flat embossment-defining connecting portions 8. The latter portions may be generally flat and serve to connect the embossments 6 and to surround each embossment so that it can be hermetically sealed to form the pockets 10.

Because the sheet 4 is very thin and the air in the pockets does not maintain the pockets in inflated positions, the embossments 6 cannot maintain their shape and become wrinkled or irregular after being used. As shown in FIG. 5, each of the embossments 6 has an endless upright peripheral side wall 14 and a wrinkled bottom wall 16 which is generally parallel to the sheet 2 when the underlay is in use. The embossments 6 are preferably rounded or circular or in the form of regular polygons having 5 to 20 or more sides. The embossments 6 preferably have the general form of a regular polygon which has rounded corners or is free of sharp corners. As used herein, the term "regular polygon" refers to regular polygons which have at least five sides and which may have a large number of sides so as to be substantially circular.

In making the carpet underlay of this invention the sheet 4 is preferably placed in a position with the pockets 10 facing upwardly to receive the pieces of foam 12. The pockets may be filled with the foam pieces and the excess scraped off with a doctor knife or other suitable means so that pockets are somewhat less than full as indicated in FIG. 3. Thereafter, the base sheet 2 may be adhered to the flat connecting portions 8 of the sheet 4 to form the laminate A.

The flat connecting portions 8 may be bonded or fused to the sheet 2 by heat sealing or other conventional methods to form hermetically sealed pockets 10 containing the foam pieces and a substantial amount of air and water. Where heat sealing or fusing is effected by embossing rolls or the like or by applying a high pressure to the portions 8 of the sheet 4 and the underlying portions 18 of the sheet 2, the portions 8 and 18 may be deformed and substantially reduced in thickness. The bond between the portions 8 and 18 provides an air-tight seal around each pocket 10 and should be a strong permanent bond to prevent flow from one pocket to the other; however, the bond may be weaker than the peripheral walls 14 of the pockets or such that the bond will fail before the walls rupture under an excessive load. Such a failure will result in movement of air from one pocket to an adjacent pocket but need not result in loss of air or moisture from the underlay.

The embossments 6 are shown in FIGS. 1 to 5 with a wide spacing for ease of illustration and to facilitate identification of the various parts. However, better results are obtained with the embossments closer together so that the walls 14 move into engagement with each other under load. This reduces the chances of rupturing the sheet 4 and can also provide better load-deflection characteristics.

FIG. 6 shows the preferred carpet underlay A, which is the same as the underlay A of FIGS. 4 and 5 except that the diameter of the pockets 10a is somewhat greater and the pockets are spaced closer together. The underlay A' has a generally flat sheet 2a which may be identical to sheet 2, a second sheet 4a with circular embossments 6a similar to embossments 6, flat connecting portion 8a similar to portions 8, and foam pieces 12a in the pockets 10a which may be identical to foam pieces 12. The wrinkled peripheral walls 14a of the pockets are substantially the same as walls 14a but of somewhat greater diameter and usually substantially in contact with each other as indicated in FIG. 6. When the embossed sheet 4a is formed, it has a shape generally as indicated in FIG. 2 and the embossments are spaced apart about ⅛ inch or so. It will be understood that such spacing may vary considerably as disclosed hereinafter.

FIG. 7 is a schematic view of one possible form of underlay which is not drawn to scale and does not show the preferred spacing of the embossments. However, it does illustrate the use of solid fire-retardant material with the foam. In this figure the carpet underlay 1 comprises a first generally flat flexible impervious plastic sheet 3 and a second flexible impervious plastic sheet 5 consisting of a multiplicity of closely spaced embossments 7 and embossment-defining connecting portions 9. The latter portions 9 lie in the plane of sheet 3 and bond the two sheets together to form hermetically sealed pockets 11 similar to pockets 10 of the first-described carpet underlay A. The pockets 11 may contain, in addition to the flexible polymeric cellular material or foam 13, a solid flame retardant material 15.

The underlay A, A' or 1 may comprise more than two layers of sheet material. For instance, a fabric layer may be affixed to the underside of the flat sheet 2 or 3 to reinforce the laminate. If desired, an additional layer of flexible material may be positioned over the top of the embossed plastic sheet 4 or 5 and attached or bonded thereto. However, it is usually preferable to avoid unnecessary additions which substantially increase the cost of the underlay.

The flexible plastic material used in making the first flat sheet 2 or 3 and the second embossed sheet 4 or 5 should have low air permeability and be impervious to the passage of moisture. They may be impervious due to the type of plastic used and also due to the thickness of the sheets. For example, sheets of polyethylene or copolymers of vinyl chloride and vinylidene chloride may be used with thicknesses up to 15 or 20 mils or so. The thickness may be reduced materially by applying to the sheet a thin coating of another synthetic plastic material that is highly impervious, such as saran or other polymers of vinylidene chloride, particularly those containing at least 70 or 80 percent by weight of vinylidene chloride units ($-CH_2CCl_2-$).

The plastic sheets used in the carpet underlay of this invention may have widely varying thicknesses from 1 mil to 20 mils or greater, but excessive thickness is preferably avoided. The generally flat sheet 2 or 3 should have a thickness of at least about 2 mils and preferably has a thickness from about 3 to about 10 mils in inexpensive underlays, but it functions well in thicknesses as high as 20 mils.

It is generally preferable to have the embossed sheet 4 or 5 thinner than the flat sheet 2 or 3, but both may have the same thickness, particularly if the thickness is in the range of 2 to 10 mils. The embossed sheet has a thickness usually from 1 to 10 mils, preferably 2 to 6 mils, and more preferably 3 to 6 mils. The preferred thickness depends, however, on the type of plastic used and will be greater when the plastic is more permeable. However, the thickness is less than that which is needed to enable the walls of the embossments to maintain a fixed shape, and such walls therefore assume wrinkled or irregular shapes.

The flat plastic sheet 2 or 3 and the embossed plastic sheet 4 or 5 may be made from a large number of different flexible synthetic plastic materials including thermoplastic materials, thermosetting materials and elastomeric materials. Thermoplastic materials are preferred. For cost reasons, the preferred materials for the underlay of this invention are polyethylene, polyvinyl chloride and polypropylene, and these are preferably coated with or covered with an impervious cover layer of a saran or other polymer of vinylidene chloride.

A large number of other plastic materials can be used, particularly when such a saran cover layer is employed. These include chlorinated polyethylenes, copolymers of ethylene and vinyl acetate, polyphenylene oxide, ionomer resins, polyallomers, propylene-ethylene-polyallomerpolymers, and various vinyl polymers and copolymers including polyvinylidene chloride, polyvinyl carbazole, polyvinyl acetate, polyvinyl chloride-nitrile rubber blends, copolymers of vinyl chloride and vinyl acetate or other copolymerizable unsaturated monomers, copolymers of vinylidene chloride and vinyl chloride or other copolymerizable unsaturated monomers, and the like. These plastics may contain other additives such as antioxidants, antiozonants, inhibitors, chemical stabilizers, plasticizers, softeners, peptizers, processing aids, dispersing agents, tackifiers, reinforcing and filling materials, inorganic and organic colorants, dusting and dipping agents, finishes, lubricants, adhesives, bonding agents, blowing agents, blowing promoters, odorants, antistaining agents, catalysts, modifiers, extenders, and solvents. However, most of these are unnecessary.

The two sheets used in the carpet underlay of this invention are preferably made of polyethylene or polyethylene coated with an impermeable layer of a saran comprising polyvinylidene chloride or a vinyl chloride-vinylidene chloride copolymer containing 80 to 90 percent by weight of vinylidene chloride units. The saran layer should have a minimum thickness of at least 0.2 mil and may, for example, have a thickness of 0.3 mil to 2 mils or greater. The saran may be a copolymer of a major amount by weight of vinylidene chloride and a minor amount by weight of one or more copolymerizable unsaturated monomers, such as vinyl chloride or other vinyl monomer, and the copolymer preferably contains at least 75 percent by weight of vinylidene chloride units ($-CH_2CCl_2-$).

If the sheets are made of a conventional polyvinyl chloride, they preferably contain small amounts of conventional plasticizers and other compounding ingredients for improved flexibility and other properties.

The embossments 6 should be closely spaced and in a regular pattern so as to provide proper support over the entire carpeted area. They can provide more support with a foam of a given density if they have a generally square, rectangular or hexagonal shape and are substantially in contact, for example, in a checkerboard or waffle pattern. However, it is best to avoid sharp or square corners such as those present in a triangle or square.

It is necessary to space the embossments apart a small distance, such as .05 inch to 0.3 inch, to provide the connecting portions 8 with a width sufficient for effective sealing so that the pockets 10 can be hermetically sealed. Each embossment 6 is preferably spaced from each of the adjacent embossments a distance of no more than 0.2 inch (i.e., about 0.1 to about 0.2 inch). It will be understood that such spacing as defined in the specification and claims relates to the spacing at the plane of the connecting portions 8, for example, when the sheet 4 is originally formed (see FIG. 2), and does not refer to the spacing of the peripheral walls 14 of the embossments which become deformed and preferably move into engagement as shown in FIG. 6.

Best results are obtained when the embossments 6 are either of oval shape or are generally in the form of a regular polygon with rounded corners, including those which are substantially circular and those having the general shape of a polygon such as hexagon, octagon, decagon, dodecagon, quindecagon or hexadecagon with sides that are either flat or bowed. An elliptical or other oval shape can also be used. A circular configuration is generally preferred to provide even expansion under load and more uniform stress in sheets 2 and 4 with less tendency for delamination, wall rupture or other failure. For similar reasons it is preferable to round the corners and/or curve the walls when employing non-circular polygonal embossments.

The shapes referred to above are the normal shapes or those which the embossments have when originally formed, it being understood that the walls 14 and 16 are irregular or wrinkled after they have been deformed.

It is important that the embossments 6 have an irregular contour, such as shown in FIGS. 4 to 7, rather than being fully inflated or of smooth contour when the compressive load is removed. The embossments are preferably partially collapsed or partially deflated so that the initial load applied to the underlay is taken by compression of the foam material 12 rather than by the resistance to air compression and so that the air pressure in the pockets 10 is not excessive under heavier loads.

The embossments-defining connecting portions 8 may be generally flat and have a shape which depends on the shape of the embossments 6. When the embossments are circular, they have a shape as shown in FIG. 1 and FIG. 4 with narrow portions 20 having a width corresponding to the minimum distance between the embossments and wider portions 22. The width of the connecting portion 8 may vary from 0.05 inch to 0.5 inch and is preferably no more than 0.4 or 0.5 inch at the widest portion 22. The preferred width at the narrow portion 20 is 0.05 to 0.2 inch and such that the peripheral walls 14 of adjacent embossments 6 move into engagement under load.

The attachment of base sheet 2 to embossed sheet 4 through the connecting portions 8 is such that a seal is formed throughout the periphery of each embossment to provide hermetically sealed pockets 10. The attachment may be made by a wide variety of methods, particularly those including fusing or the sheets and gluing or bonding of the sheets with adhesives. Fusing may be accomplished by direct melting, such as by application of heated platens bringing embossment-defining areas 9 in to contact with first plastic sheet 3. Other methods include dielectric heating and infrared heating.

A wide variety of conventional adhesives may be used to bond the sheets together and include, depending upon the composition of the particular plastic sheets, acrylic adhesives, alkyd adhesives, bitumens, casein, cellulose acetates, cellulose caprate adhesives, cellulose nitrate, cyanoacrylate adhesives, epoxy-polyamide adhesives, phenolic-polyamide adhesives, phenolic-vinyl adhesives, polyamides, polyisobutylenes, polystyrene adhesives, polyvinyl acetals, polyvinyl acetate adhesives, rosin, epoxy adhesives, furan adhesives, melamine-formaldehyde adhesives, oleo resins, phenol-formaldehyde adhesives, phenolic-epoxy adhesives, phenolic-neoprene adhesives, phenolic-nitrile adhesives, polyester adhesives, polyurethane adhesives, resorcinol-formaldehyde adhesives, urea-formaldehyde adhesives, polychloroprene adhesives, and acrylonitrile-butadiene adhesives. However, it is preferable to employ heat sealing or fusing rather than adhesives alone. This can be effected in a continuous mass-production process at low cost using known machines such as are referred to hereinafter.

The carpet underlay of the present invention is unique in several ways. First it can be formed with pieces of inexpensive scrap foam without rebonding the foam or increasing its density. Second it can employ low density foam which is less costly and can be made with a low weight which facilitates handling. Third, it concurrently provides partial support by air compression with load-deflection characteristics which are superior to anything provided by conventional foam rubber carpet underlays. Fourth, it provides fireproofing at minimum cost by use of water in the hermetically sealed pockets.

The elastomeric foam used in the carpet underlay of this invention may be of any conventional type suitable for cushioning applications or used in carpet underlays. The foam is preferably an open-cell foam and is preferably formed of polyurethane but also may be polyvinyl chloride foam, polyethylene foam, rubber latex foam, neoprene foam or other elastic rubber foams. Polyurethane foam is preferred because of its excellent properties and low cost. Polyvinyl chloride foam is less desirable but can be more fire retardant.

The foam can be cut to fit the pockets 10, but this is generally not practical because of cost. The foam should be in the form of discrete pieces of scrap foam small enough to fit the pockets 10 without providing excessive thickness. They may be cut or ground by conventional methods and have a maximum length of 0.1 to 1 inch. The average length would preferably be from about 0.2 to about 0.5 inch and the minimum length would preferably be 0.05 or 0.1 inch. The foam pieces would preferably be small enough so that they could easily move through a screen with openings of about 0.2 to about 0.5 inch, such as a ¼-inch or ⅜-inch screen.

Large pieces of scrap foam may be broken up into pieces of suitable size for use in the carpet underlay by commonly used cutting or grinding equipment. For example, slabs of foam can be cut to long lengths with a square cross section about 4 inches wide and then fed to a machine having hammers which sheer the foam and break it down so that it can be forced through a screen, i.e., a ⅜-inch screen). The larger pieces rejected by the screen are returned to the hammer. It will be noted that the pieces of foam can be compressed somewhat while passing through the screen and may frequently have a length somewhat greater than the width of the screen opening.

The pieces of polyurethane foam or other elastic foam may easily be loaded into the pockets 10 while they are facing upwardly as in FIG. 2. A measured amount may be placed in each pocket. This is preferably accomplished by providing the pockets with the proper size and shape and filling them with pieces of foam 12 of proper size as indicated in FIG. 3. The excess above the plane of the connecting portion 8 may be easily scraped off by a doctor blade or the like. Of course, this process will provide more uniform foam thickness in the pockets if the size of the foam pieces is not excessive. It will be noted that the pockets 10 are not completely full in FIG. 3 after the scraping operation described above because the foam surface is irregular.

The embossments of the carpet underlay, such as embossments 6, have a shape such that they may collapse partially and assume an irregular shape after the underlay has been placed in use or subjected to compressive loads. In other words, an air space is provided between the walls of the embossment and the compacted foam layer after the load has been removed. The air space results from the shape of the embossment 6 and also from the size of the foam particles brushed off at the plane of portion 8 when using the loading process described above. The amount of air in each pocket may also be determined by the process used to effect sealing.

The maximum height of the embossments 6 may vary anywhere from ¼ inch to 1.5 inch but is preferably from about 0.3 to about 1 inch. The diameter or maximum width of the embossments may also vary substantially and is preferably from about 0.8 inch to about 1.6 inches. The perimeter of the embossment or the length of the peripheral wall 14 should be from about 2 to about 6 inches and preferably no more than 5 inches (i.e., 2.5 to 5 inches).

The compacted foam layer formed by the particles 12 has a thickness less than the height of the embossment 6 which is generally in the range of from about ¼ inch to about ⅝ inch and preferably from ¼ inch to ½ inch. It will be understood that the thickness of such elastic foam layer as referred to in the specification and claims hereof means the thickness of the foam after it has been compressed by a load between parallel surfaces and the load removed so that the compacted foam layer returns to its normal shape (as in FIG. 5, for example). Such thickness should be limited so that the carpet underlay has the desired overall thickness not in excess of 0.65 inch (i.e., ¼ inch to ½ inch).

The preferred thickness of the foam layer 12 depends on the density of the foam used. Such density should be from 1 to 4 pounds per cubic foot and preferably 1 to 3 pounds per cubic foot. If the foam thickness is 0.2 inch, it may be necessary to employ a density of 4 pounds per cubic foot, but the denser foam is more expensive and the underlay is less effective when very thin. It is most desirable to provide a foam layer with a thickness of ¼ inch to ½ inch using pieces of foam having a density of 1.5 to 3 pounds per cubic foot.

The foam density varies with the thickness of the foam layer and can be 1 to 2 pounds per cubic foot when the foam layer thickness is ⅜ to ⅝ inch. It is more preferably 2 to 3 pounds per cubic foot when the foam layer thickness is ⅜ to ½ inch, but can be 3 to 4 pounds per cubic foot when the foam layer thickness is only ¼ to ⅜ inch.

The carpet underlay of this invention is formed to provide a controlled amount of air in the hermetically sealed pockets 10 and a layer of foam of the proper thickness and density to provide the underlay with the proper load-deflection characteristics and other properties necessary for an acceptable carpet underlay. The underlay would be unacceptable with too much air in the pockets 10 or two much load taken by air compression, and air cushions have never been considered acceptable for use as carpet underlay prior to the present invention. The underlay of the present invention is constructed so that all or a major portion of a small load is taken up by compression of the foam layer at low deflection and preferably so that a major portion of the load is taken by compression of the foam at a 10 percent deflection. The pockets 10 contain an amount of entrapped air which will support at least 20 percent of the load and preferably at least 30 or 40 percent of the load at high deflections. For example, at least one-fourth of the load is preferably supported by compression of air in the pockets 10 at a 75 percent deflection.

The amount of air and the amount of foam in the pockets may vary considerably. For example, in one underlay a major portion of the load might be taken by the foam at a deflection of 25 to 40 percent or more. In another underlay, 20 to 50 percent of the load could be taken by the air compression and 80 to 50 percent by the foam at 75 percent deflection. Generally, the amount of air is preferably limited so that substantially all of the weight of the carpet is supported by the foam rubber of the underlay (at minimum deflection).

As used herein, the expression "percent deflection" refers to the maximum deflection under the applied load or the deflection when equilibrium is achieved. Therefore, a light load will produce a small percent deflection, and a heavy load is required to produce a high deflection.

The carpet underlay of this invention is particularly advantageous because it can be provided with high fire resistance at minimum cost using an inexpensive non-flammable or fire-retardant liquid, such as water. The liquid volume of the water or liquid in each pocket 10 is no more than about half the volume of the compacted foam layer at 12 and less than half the volume of the pocket 10. Such liquid volume is at least 5 percent and preferably 20 to 50 percent of the volume of the foam. The weight of water in the underlay can be from 3 to 30 times the weight of the elastic foam (usually at least 5 times) and can be 1 to 12 pounds in each square yard of the underlay (preferably 2 to 8 pounds per square yard of underlay). The overall weight of the underlay including the plastic sheets and the foam material should preferably be from about 2 to about 10 pounds per square yard.

The preferred amount of water and foam material can vary in different underlays made according to the invention. Good results can be obtained where the foam layer at 12 has a thickness from 3/8 to 5/8 inch and a density of 1 to 2 pounds per cubic foot and the water in the pockets 10 has a weight 10 to 30 times the weight of the foam. Where the foam layer has a thickness of from 1/4 to 1/2 inch and a density of 2 to 3 pounds per cubic foot, the water in the pockets can have a weight 5 to 20 times the weight of the foam. Where the foam layer has a thickness of only 1/4 to 3/8 inch and a density of 3 to 4 pounds per cubic foot, the water can have a weight 3 to 15 times the weight of the foam.

The non-flammable or fire-retardant liquid used in the carpet underlay of this invention is preferably water, but other liquids can be used usch as various Freons and chlorinated hydrocarbons (i.e., Freon 11, Freon 12, Freon 22, etc.). Other conventional flame-retardant or smoke-retardant materials may also be placed in the pockets with the foam material including phosphate esters of the halogenated and non-halogenated type, antimony oxide, boron compounds, chlorinated paraffins and phosphorus compounds (see U.S. Pat. No. 3,647,724). However, water alone provides excellent results, and it is preferable not to use large amounts of other fire-retardant materials. On a cost per pound basis, water is far superior to any other material for this purpose.

The carpet underlay of this invention may be made from a wide variety of processes both by hand and by machine. A number of processes are suitable for such purpose, either as disclosed or by minor modification (see, for example, U.S. Pats. Nos. 1,970,803; 2,466,533; 2,738,297; 3,011,930; 3,012,926; 3,041,221; 3,208,989; 3,285,793; 3,294,387; 3,294,389; 3,346,438; 3,392,081; 3,415,711 and 3,423,262).

In carrying out the process of this invention the pieces of scrap polyurethane foam can be wet or thoroughly saturated with water before they are placed in the pockets 10. It is also possible to add to the pockets 10 measured amounts of water before or after the foam particles are in place. The preferred method is to wet the foam first. This means that some liquid may be on the connecting portions 8 after the doctor knife pushes off the excess foam. It is preferable to dry the portions 8 or remove the water before applying an adhesive or before the heat sealing operation to connect the sheets 2 and 4. If an adhesive is used, a latex adhesive would reduce the water problem.

Heat sealing is the preferred method and can provide hermetically sealed pockets 10 in the carpet underlay which can hold water for 10 to 20 years or more. The carpet underlay of this invention is revolutionary in that it makes it possible to obtain excellent results at a cost of manufacture a fraction of that of conventional carpet underlays without sacrifice of quality and with improved load-deflection characteristics.

While it is generally preferred to form the carpet underlay of this invention using foam pieces of substantially the same density, it will be understood that the foam layer at 12 may contain foam pieces of different density. For example, it is possible to include 1 to 20 percent by weight of foam with a density of 4 to 6 pounds per cubic foot in the foam layer, but there is usually no advantage in doing this.

The carpet underlay of this invention may be of various sizes and shapes and made of various polymeric materials. It is preferably of the general type shown in FIG. 6 with the embossments closely spaced. For example, a suitable carpet underlay A (see FIGS. 1 to 5) with an overall thickness of about 0.3 to 0.4 inch can be formed from composite sheets 2 and 4 with a width of 12 feet and a length of 50 feet or more formed by calendering a sheet of polyethylene to a sheet of saran. The sheet 2 may have an overall thickness of 6 mils including a layer of polyethylene with a thickness of 4 mils and a layer of saran with a thickness of 2 mils. The sheet 4 may have an overall thickness of 5 mils including a layer of polyethylene with a thickness of 3 mils and a layer of saran with a thickness of 2 mils. The embossments 6 may be formed to a generally hemispherical shape with a depth of about 0.7 to 0.8, inch, a diameter of about 1¼ inches, and a center-to-center distance of about 1⅜ inches so that each embossment is spaced about ⅛ inch from all of the adjacent embossments.

The pockets 10 may be partially filled with pieces of scrap polyurethane foam 12 with a density of about 2 to 2.5 pounds per cubic foot which are ground or sheared and forced through a ⅜-inch screen. These scraps may be wet with water before being placed in the pockets 10 so that after the heat sealing operation, the hermetically sealed pockets contain an amount of water having a weight about 8 to 10 times the weight of the foam, a foam layer with an effective thickness of from about 0.3 to 0.4 inch, and an amount of air such that at least 20 or 30 percent of the load is taken by air compression under high loads and a major portion of the load is taken by compression of the elastic foam at low deflections. The amount of air can be predetermined to provide the most satisfactory load-deflection characteristics.

It will be understood that, in accordance with the provisions of the patent statutes, variations and modifications of the specific articles or methods disclosed herein may be made without departing from the spirit of the invention.

Having described my invention, I claim:

1. A laminated carpet underlay adapted to resiliently deflect in response to compressive loading comprising:
    (A) a pair of flexible fluid impervious plastic sheets attached together;
    (B) at least one of said sheets including embossments defining a multiplicity of hollow pockets having upright peripheral walls;
    (C) said embossments defining narrow connecting portions extending around each of said pockets and attached to the other of said sheets to separate each of said pockets in fluid sealed relation from adjacent said pockets;

(D) said peripheral walls of each of said pockets being adapted to deflect into mutually supporting contact with adjacent said peripheral walls responsive to compressive loading of said underlay;

(E) discrete pieces of flexible polymeric foam loosely filling each of said pockets and adapted to resiliently resist compressive loading of said underlay through full deflection of said underlay;

(F) a flame retardant material interspersed with said foam in each of said pockets in an amount of 5% to 50% of the volume of said foam; and (G) the remainder of each of said pockets being filled with air under compression selected for said air to resiliently resist about 20% to 50% of said compressive loading while said foam is concurrently resisting 80% to 50% of said compressive loading.

2. A laminate according to claim 1 in which said sheets are formed of polyethylene and said foam is formed of polyurethane having an open cell structure.

3. A laminated carpet underlay adapted to resiliently deflect in response to compressive loading comprising:

(A) a pair of flexible fluid impervious plastic sheets attached together;

(B) at least one of said sheets including embossments defining a multiplicity of hollow pockets having upright peripheral walls;

(C) said embossments defining narrow connecting portions extending around each of said pockets and attached to the other of said sheets to separate each of said pockets in fluid sealed relation from adjacent said pockets;

(D) said peripheral walls of each of said pockets being adapted to deflect into mutually supporting contact with adjacent said peripheral walls responsive to compressive loading of said underlay;

(E) discrete pieces of flexible polymeric foam loosely filling each of said pockets and adapted to resiliently resist compressive loading of said underlay through full deflection of said underlay; and (F) the remainder of each of said pockets being filled with air under compression selected for said air to resiliently resist about 20% to 50% of said compressive loading while said foam concurrently is resisting 80% to 50% of said compressive loading.

4. A carpet underlay according to claim 3 in which each pocket is generally round.

5. A carpet underlay according to claim 3 in which the sheets are fused together throughout the periphery of each pocket.

6. A carpet underlay according to claim 5 in which the seal between adjacent pockets has a strength relative to the walls of the pockets such that it will break under heavy loads before said walls rupture.

7. The underlay according to claim 3 further comprising a flame retardant liquid interspersed with said foam in each of said pockets in the amount of 3 to 30 times the weight of said foam.

8. A carpet underlay according to claim 7 in which the fire-retardant liquid is water and the liquid volume of the water is no more than half the volume of the foam.

9. A carpet underlay according to claim 3 having a weight from about 2 to about 10 pounds per square yard.

10. A carpet underlay according to claim 3 in which the density of said foam is from about 1 to about 2 pounds per cubic foot and, the pockets contain water with a weight 10 to 30 times the weight of the foam.

11. A carpet underlay according to claim 3 in which the density of said foam is from about 2 to about 3 pounds per cubic foot and the pockets contain water with a weight 5 to 20 times the weight of the foam.

12. A carpet underlay according to claim 3 in which the air compresed in the pockets supports at least ¼ of the load at 75 percent deflection.

13. A carpet underlay according to claim 12 in which the compressed foam supports a major portion of the load at 10 percent deflection.

14. A carpet underlay according to claim 13 in which the foam comprises polyurethane scrap.

15. A carpet underlay according to claim 14 in which at least one of said sheets has an outer moisture impervious layer formed of a polymer of vinylidene chloride.

16. A carpet underlay according to claim 15 in which said last-named sheet comprises a major portion by weight of polyethylene.

17. A carpet underlay according to claim 3 in which said foam is formed of polymers selected from the group consisting of polyurethane, polyvinyl chloride, rubber latex and polyethylene foam.

18. A carpet underlay according to claim 17 in which said sheets are formed of polymers selected from the group consisting of polyethylene, polyvinyl chloride and polypropylene.

19. The underlay of claim 3 wherein said foam comprises an open cell type polyurethane.

20. The underlay of claim 3 wherein the density of said foam is 1 to 4 pounds per cubic foot.

21. The underlay of claim 3 further comprising a flame retardant interspersed with said foam in each of said pockets in the amount of 3 to 30 times the weight of said foam.

22. The underlay of claim 21 wherein said flame retardant material comprises a powder.

23. The underlay of claim 21 wherein said flame retardant material comprises a liquid.

24. The underlay of claim 21 wherein said flame retardant comprises water in the amount of 3 to 30 times the weight of said foam.

25. The underlay of claim 1 wherein said foam comprises an open cell type material.

26. The underlay of claim 25 wherein the density of said foam is 1 to 4 pounds per cubic foot.

27. The underlay of claim 26 wherein said flame retardant material comprises water.

28. The underlay of claim 27 wherein said flame retardant comprises water in the amount of 3 to 30 times the weight of said foam.

References Cited

UNITED STATES PATENTS

| | | | |
|---|---|---|---|
| 3,294,387 | 12/1966 | Chavennes | 161—127 |
| 2,821,244 | 1/1958 | Beck | 161—127 |
| 3,549,472 | 12/1970 | King | 161—162 X |
| 2,385,500 | 9/1945 | Fasold et al. | 252—2 |

GEORGE F. LESMES, Primary Examiner

P. C. IVES, Assistant Examiner

U.S. Cl. X.R.

161—67, 122, 130, 148, 161, 403; 252—8.1

UNITED STATES PATENT OFFICE
CERTIFICATE OF CORRECTION

Patent No. 3,813,279          Dated May 28, 1974

Inventor(s) Lawrence C. Varner, Jr.

It is certified that error appears in the above-identified patent and that said Letters Patent are hereby corrected as shown below:

Column 4, line 29, "A." should read -- A' --.

Column 7, line 62, "screen, i.e.," should read -- screen (i.e.,

Signed and sealed this 26th day of November 1974.

(SEAL)
Attest:

McCOY M. GIBSON JR.
Attesting Officer

C. MARSHALL DANN
Commissioner of Patents